United States Patent [19]

Levinson et al.

[11] Patent Number: 5,035,964
[45] Date of Patent: Jul. 30, 1991

[54] PASSIVE COOLING DEVICE FOR EXTENDING BATTERY LIFE

[75] Inventors: Lionel M. Levinson; Dale M. Brown; Roy F. Thornton, all of Schenectady, N.Y.

[73] Assignee: General Electric Company, Schenectady, N.Y.

[21] Appl. No.: 444,338

[22] Filed: Dec. 1, 1989

[51] Int. Cl.[5] .......................................... H01M 10/50
[52] U.S. Cl. ...................................... 429/120; 165/53
[58] Field of Search .......................... 429/120; 165/53; 324/140 R

[56] References Cited

U.S. PATENT DOCUMENTS

| | | | |
|---|---|---|---|
| 2,666,091 | 1/1954 | Martin et al. | 429/120 |
| 3,822,150 | 7/1974 | Beardshear et al. | 429/120 X |
| 4,076,074 | 2/1978 | Tompkins | 165/53 |
| 4,329,407 | 5/1982 | Gross et al. | 429/120 X |
| 4,333,517 | 6/1982 | Parro | 165/53 X |
| 4,629,622 | 12/1986 | Yonezu et al. | 429/120 X |
| 4,865,928 | 9/1989 | Richter | 429/120 |

Primary Examiner—Stephen J. Kalafut
Attorney, Agent, or Firm—Marvin Snyder; James C. Davis, Jr.

[57] ABSTRACT

An electrical-energy-supplying device having an extended storage life includes a finned heat sink; a battery for supplying electrical energy is thermally connected to the finned heat sink by a copper or aluminum bar for transferring heat from the battery to the heat sink. The heat sink is enclosed in a chimney structure which has an air inlet in a lower portion and an outlet in an upper portion thereof. The chimney lower portion has a heat and light absorbing coating which causes air to flow in a path between the air inlet and outlet by convention. The heat sink is positioned in the air flow path the facilitate heat dissipation from the sink to the atmosphere. The storage life of the battery may be extended by maintaining the battery temperature below a selected temperature level.

20 Claims, 1 Drawing Sheet

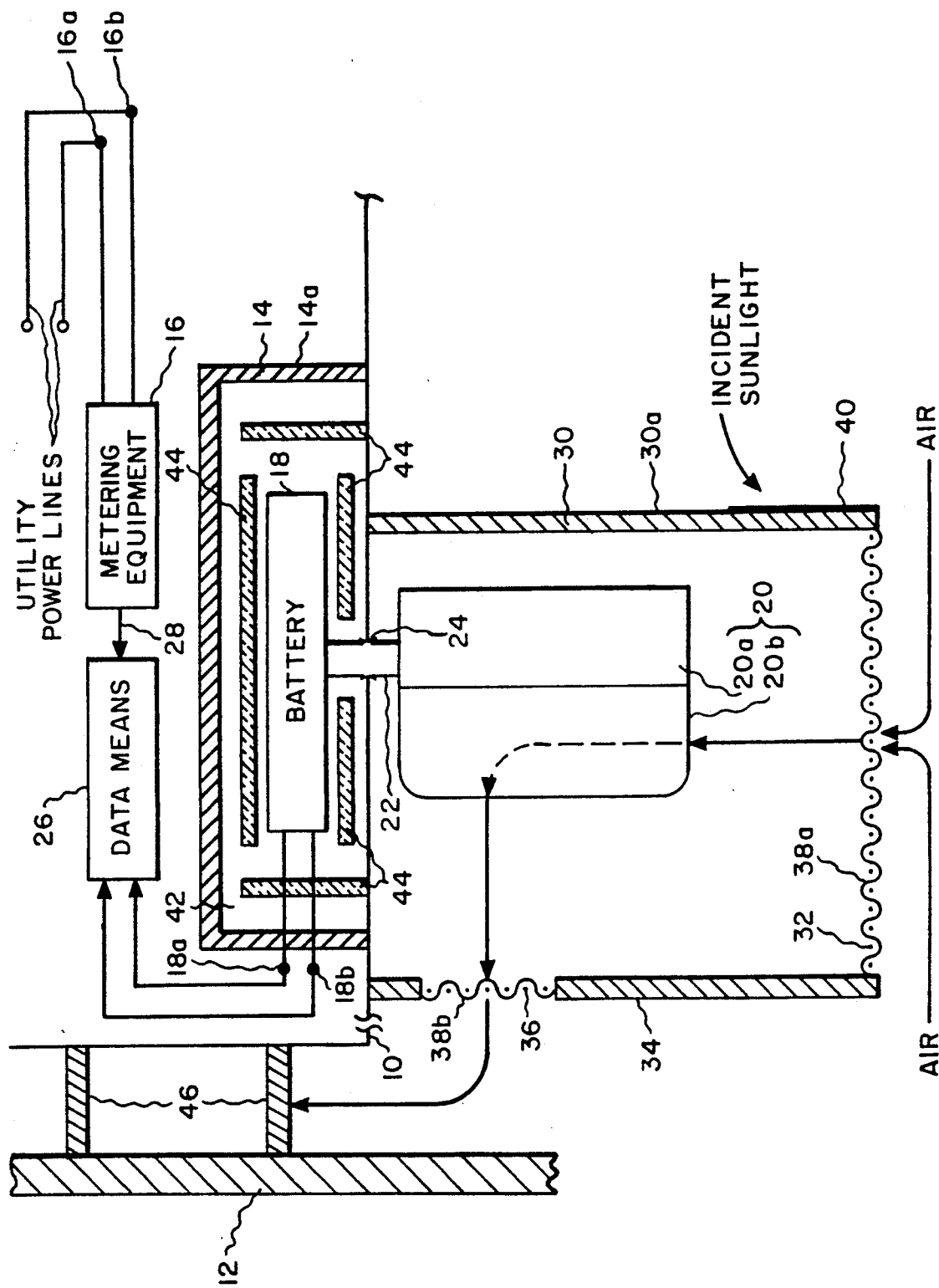

PASSIVE COOLING DEVICE FOR EXTENDING BATTERY LIFE

BACKGROUND OF THE INVENTION

The present invention relates to battery backup power systems and, more particularly, to a passive cooling device for extending the life of a battery backup power system used for powering electronic components when utility line power is interrupted or unavailable.

Use of a battery or an electrolytic-type device to provide backup power to electronic equipment during a power outage is known in the art. One such application is with time of use (TOU) watt-hour meters. TOU watt-hour meters permit electric utilities to apply complex rate structures to their customers. TOU watt-hour meters typically sample a customer's energy usage at selected times and record the kilowatts used with the corresponding time of use; thus, different billing rates can be applied for different times of the day, days of the week and even during certain times of the year, such as holidays and different seasons. These meters typically utilize an application specific integrated circuit (ASIC), microprocessor or the like for recording the kilowatts and the time of use. The ASIC will also include a clock for measuring time and maintaining calendar information. The ASIC and clock are powered by the utility line power under normal operating conditions, but these type meters also usually have a battery for backup ASIC power when utility line power is interrupted. The battery will maintain operation of the ASIC clock during power outages to prevent the need for a maintenance visit by utility personnel to reset the system clock and correct for the period of power outage after power is restored.

A lithium-type battery may be used in TOU watt-hour meters to maintain the ASIC clock during power outages, but these type batteries have a limited shelf life and must be replaced about every five years at a cost of about $10 per battery. Maintaining reliable battery backup for TOU watt-hour meters is therefore a considerable burden for utility companies when considering the number of units in the field and the logistics and record-keeping requirements. To meet the needs of most utility companies which use TOU watt-hour meters, a desired backup battery power system will: have a shelf life in excess of about 10 years; and provide approximately 2-5 volts and 1-10 μ amps for more than about 30 days. Solid state lithium iodine-type batteries, such as those used in heart pacemakers and the like, typically have a life in excess of about 20 years when operated at body temperature, i.e., about 37° C. However, the life of these pacemaker-type batteries decreases and the current and voltage levels are unreliable when the batteries are stored at higher temperatures. TOU watt-hour meters can be exposed to temperatures as high as about 85° C. for long periods in some climates; under such conditions, the capacity of the battery can decrease by about 80 percent in five years.

Similarly, other types of batteries also experience a decrease in capacity when exposed to high temperatures and therefore it is desirable to maintain battery temperature below a selected level.

Active cooling of a TOU watt-hour meter battery using a thermoelectric (TE) cooling module and associated electronics was disclosed and claimed in co-pending application Ser. No. 07/387,183, filed July 31, 1989, assigned to the same assignee as the present invention, and incorporated herein in its entirety by reference. The TE cooling device and controlling electronics disclosed is highly efficient but has a moderate cost; the utility power line is tapped to provide power to the TE working module when the cooling control circuitry senses a battery temperature in excess of a selected level. Since the TE working module is operated by DC voltage, the AC utility power must be transformed, converted to DC and conditioned to remove harmonics for efficient operation of the TE module. Additionally, the reliability of the TE module, the associated control electronics and the signal transforming and conditioning means is a consideration.

It is accordingly a primary object of the present invention to provide a novel passive cooling device for cooling a temperature-sensitive component.

It is another object of the present invention to provide a novel backup power supply device for a TOU watt-hour meter, which is not subject to the foregoing disadvantages.

It is a further object of the present invention to provide a passive device for cooling the backup battery for a TOU watt-hour meter to extend the useful life of the backup battery.

These and other objects of the invention, together with the features and advantages thereof, will become apparent from the following detailed specification when read with the accompanying drawings in which like reference numerals refer to like elements.

SUMMARY OF THE INVENTION

In accordance with the present invention, an electrical-energy-supplying device having an extended storage life, which may be used as a battery backup power system when utility power is interrupted, includes a heat sink and battery means for supplying electrical energy; the battery means is thermally connected to the heat sink by means for transferring heat energy from the battery casing to the heat sink. The battery and at least a top portion of the heat energy transferring means, in contact with the battery, may be housed in an insulated enclosure to improve cooling efficiency; the skin of the enclosure may be fabricated from a heat and light reflective-type material. The heat sink preferably has cooling fins and is mounted at an upper end of a chimney-like structure fabricated from a material which is both heat and light reflective; the opposite bottom end of the chimney is open and an upper portion of the chimney sidewall proximate to the heat sink has an opening formed therein. The chimney sidewall lower portion, proximate to the open end, has an exterior surface which is coated with a heat and light absorbent material, such as flat black paint and the like. Air in the chimney lower portion will be warmed when light or other heat energy is incident upon the heat absorbent material; the warmed air will rise in the chimney by convection, flow through the heat sink fins (to dissipate heat therefrom) and out the opening in the upper sidewall portion. Air will continuously circulate through the chimney as long as light or heat energy is incident upon the heat absorbent material because the rising warmed air will create a draft which will draw fresh air into the open bottom of the chimney; this air will be warmed slightly in the chimney lower portion and also rise to cool the heat sink.

In accordance with an embodiment of the present invention, the battery means and insulated enclosure may be mounted in the housing of a TOU watt-hour meter to supply backup power to a data means, such as an ASIC or the like, to cause the data means to maintain clock and calendar information when utility power is interrupted. The heat sink and chimney are preferably mounted on the outside of the meter housing.

BRIEF DESCRIPTION OF THE DRAWINGS

The single Figure is a side elevation view of the electrical-energy-supplying device in accordance with the present invention.

DETAILED DESCRIPTION OF THE PREFERRED EMBODIMENT

Referring to the Figure, a TOU watt-hour meter housing 10 is typically mounted on an exterior wall 12 of a structure to which the utility company is supplying electrical power. In accordance with the present invention, an insulated enclosure 14 is mounted in meter housing 10 at an appropriate location therein where enclosure 14 will not interfere with the operation of the metering equipment 16 (shown in block diagram form). Insulated enclosure 14 is preferably constructed with at least an exterior surface 14a of a light and heat reflective material so that sunlight will not appreciably heat the components housed within. A battery means 18, such as a lithium-type battery, "pacemaker-type" battery or the like, is contained within insulated enclosure 14 and is thermally connected to a heat sink 20 by a thermal link means 22, such as an aluminum or copper bar and the like, for transferring heat from battery 18 to heat sink 20. Heat sink 20 includes a plate member 20a and a plurality 20b of fins through which air may pass for cooling the heat sink; heat sink 20 is preferably mounted external to meter housing 10 and thermal link means 22 extends between battery 18 and heat sink 20, though an opening 24 in meter housing 10. Insulated enclosure 14 may also extend along the lower interior sidewall of housing 10 to substantially completely enclose battery 18 except for opening 24 which would extend through enclosure 14.

Battery 18 should typically have a casing of heat conductive material to facilitate cooling of the battery as a whole. Battery 18 includes battery terminals 18a and 18b for electrically connecting battery 18 to a data means 26, such as an application specific integrated circuit (ASIC), microprocessor or the like, of the TOU watt-hour meter. Battery 18 will supply electrical power to a clock, integrally formed with data means 26, when utility line power is interrupted. Data means 26 is electrically coupled to metering equipment 16 by a signal transmission path 28 over which data means 26 receives electrical usage information, which data means 26 stores with time of use information. Metering equipment 16 has terminals 16a and 16b for connecting the metering equipment to the utility power lines.

Heat sink 20 is preferably mounted at an upper end of a chimney-like structure 30 which is attached to a lower exterior section of meter housing 10. Chimney 30 has an opening 32 at a bottom end opposite to heat sink 20 and an upper portion of the chimney sidewall 34 also has an opening 36 formed therein, adjacent to heat sink 20. Bottom opening 32 and sidewall opening 36 are each preferably covered by a mesh screen 38a and 38b, or the like, which allows air flow through the chimney but prevents insects from entering the chimney to build nests and the like. Chimney 30 is preferably constructed with at least an exterior surface 30a of a heat and light reflective material. A coating 40 of light and heat absorbent material, such as flat black paint and the like, is disposed only on a lower portion of exterior surface 30a, proximate to bottom opening 32.

Chimney 30 is preferably mounted so that sunlight will be incident on coating 40 to cause warming of the air in the lower portion of chimney 30. The warmer air will rise in chimney 30 by convection, flow between vertically-disposed and horizontally-spaced heat sink fins 20b to dissipate heat therefrom, and exit out sidewall opening 36. Heat sink fins 20b are preferably oriented so that the air passing through the chimney will flow in a parallel direction through the fins. The rising warm air will create a draft or chimney effect causing cooler air to be drawn into bottom opening 32 where it is warmed slightly, rises to cool heat sink 20, and exhausts through sidewall opening 36. Meter housing 10 is preferably spaced from wall 12 by a plurality 46 of standoffs which permit the warmed air exhausted from opening 36 to continue to rise away from housing 10 and thus not be trapped by the meter housing causing unnecessary heating thereof.

Coating 40 may extend substantially completely around the perimeter of chimney 30 lower portion or coating 40 can be applied to only that portion of the chimney perimeter which receives direct sunlight during the hottest time of the day to ensure maximum heat dissipation from battery 18. Sidewall opening 36 is also located and has sufficient size to provide optimum heat dissipation during the periods of intense solar heating; sidewall opening 36 may extend substantially completely around the chimney perimeter but is preferably formed in chimney 30 at a location that will be out of direct sunlight for optimum operation.

The interior volume 42 of insulated enclosure 14 may be packed with a foam-type insulation, such as styrofoam or the like, to reduce heating from external conditions, such as sunlight or the like, and to improve cooling efficiency. A less economical but probably more effective insulating technique is to evacuate enclosure 14 to form a vacuum and mount reflective heat shields 44 within the enclosure. Reflective heat shields 44 will retard the radiative transport of heat and the vacuum will retard the convective and conductive transport of heat to battery 18. The combination of heat sink 20, chimney 30 and insulated enclosure 14 are expected to maintain the temperature of the battery below about 30° C. when ambient temperatures exceed this level. This battery temperature is expected to provide a battery life in excess of about 10 years.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An electrical-energy-supplying device having an extended storage life, comprising:
    battery means for supplying electrical energy;
    a heat sink external to said battery means and spaced therefrom;
    link means in the form of a solid metal connection between said battery means and said heat sink for transferring heat energy by conduction from said battery means to said heat sink; and
    chimney means exposed at least in part to incident sunlight for drawing air past said heat sink to dissipate heat therefrom in dependence on the intensity of said incident sunlight.

2. The device of claim 1 further comprising an insulated enclosure for housing said battery means with at least a portion of said link means extending into said enclosure.

3. The device of claim 2 wherein said insulated enclosure has an outer surface of heat and light reflective 4. The device of claim 2 wherein said insulated enclosure is substantially filled with foam insulation material.

5. The device of claim 2 wherein said insulated enclosure is evacuated and includes a plurality of heat reflective shields mounted within said enclosure.

6. The device of claim 1, wherein said chimney means comprises:
    an enclosure having a lower portion with at least one air inlet formed therein and an upper portion with at least one air outlet formed therein, and positioned so that said heat sink is located between said at least one air inlet and said at least one air outlet; and
    a coating of heat and light absorbent material disposed on an outer surface of said lower portion to facilitate air flow between said at least one air inlet, said heat sink and said at least one air outlet.

7. The device of claim 6, wherein the uncoated portion of said chimney enclosure outer surface is heat and light reflective.

8. The device of claim 6, further comprising a screen mounted across each of said at least one air inlet and said at least one air outlet.

9. The device of claim 1 wherein said link means is a bar formed of a metal selected from the group consisting of copper and aluminum.

10. The device of claim 1 wherein said heat sink is finned.

11. A TOU watt-hour meter for measuring electrical energy usage from a utility line, comprising:
    metering means, having at least two terminals for connecting to the utility line, for measuring electrical energy usage;
    data means, coupled to said metering means, for recording electrical energy usage and time of use information;
    battery means for supplying electrical energy to said data means to maintain accurate time information if the utility line energy is interrupted;
    a heat sink external to said battery means and spaced therefrom;
    link means in the form of a solid metal connection between said battery means and said heat sink for transferring heat energy by conduction from said battery means to said heat sink; and
    chimney means exposed at least in part to incident sunlight for drawing air past said heat sink to dissipate heat therefrom in dependence on the intensity of said incident sunlight.

12. The device of claim 11 further comprising an insulated enclosure for housing said battery means, at least a portion of said link means extending into said enclosure.

13. The device of claim 12 wherein said insulated enclosure has an outer surface of heat and light reflective material.

14. The device of claim 12 wherein said insulated enclosure is substantially filled with foam insulation material.

15. The device of claim 12 wherein said insulated enclosure is evacuated and includes a plurality of heat reflective shields mounted within said enclosure.

16. The device of claim 11, wherein said chimney means comprises:
    an enclosure having a lower portion with at least one air inlet formed therein and an upper portion with at least one air outlet formed therein, and positioned so that said heat sink is located between said at least one air inlet and said at least one air outlet; and
    a coating of heat and light absorbent material disposed on an outer surface of said lower portion to facilitate air flow between said at least one air inlet, said heat sink and said at least one air outlet.

17. The device of claim 16, wherein the uncoated portion of said chimney enclosure outer surface is heat and light reflective.

18. The device of claim 16 further comprising a screen mounted across each of said at least one air inlet and said at least one air outlet.

19. The device of claim 11 wherein said link means is a bar of a metal selected from the group consisting of copper and aluminum.

20. The device of claim 11 wherein said heat sink is finned.

* * * * *